(12) United States Patent
Tracy et al.

(10) Patent No.: US 6,321,814 B1
(45) Date of Patent: *Nov. 27, 2001

(54) DISK LABELING DEVICES

(75) Inventors: Peter H. Tracy, Guilford; Gregory R. Veilliex, Wallingford; Robertson Parkman, New Haven; Michael D. Cecchi, Madison, all of CT (US)

(73) Assignee: Neato, LLC, East Haven, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/685,555

(22) Filed: Jul. 24, 1996

Related U.S. Application Data

(63) Continuation-in-part of application No. 08/410,239, filed on Mar. 24, 1995, now Pat. No. 5,543,001, which is a continuation of application No. 08/287,153, filed on Aug. 8, 1994, now abandoned, and a continuation-in-part of application No. PCT/US95/10150, filed on Aug. 8, 1995.

(51) Int. Cl.$^7$ .............................. B65C 9/36; B32B 31/00
(52) U.S. Cl. .................................. 156/556; 156/DIG. 24; 29/271; 29/464
(58) Field of Search ...................... 156/247, DIG. 1, 156/DIG. 2, 579, 379.8, 556, 538, DIG. 24; 283/81; 209/47, 909; 264/107; 369/14, 58; 29/271, 464

(56) References Cited

U.S. PATENT DOCUMENTS

| | | |
|---|---|---|
| 1,500,698 | 7/1924 | Wiehl . |
| 3,687,769 | 8/1972 | Dague . |
| 4,213,927 | 7/1980 | Alberti . |
| 4,385,460 | 5/1983 | Hanna . |
| 4,542,426 * | 9/1985 | Wilkinson, Jr. et al. . |
| 4,687,536 * | 8/1987 | Hiramatsu et al. . |
| 4,903,255 | 2/1990 | Sugaya et al. . |
| 5,001,700 * | 3/1991 | Rowden et al. . |
| 5,084,127 | 1/1992 | Nakamura . |
| 5,316,464 | 5/1994 | Lexell . |
| 5,346,654 | 9/1994 | Kodaka et al. . |
| 5,421,950 | 6/1995 | Parrish . |
| 5,783,033 * | 7/1998 | Grossman . |

FOREIGN PATENT DOCUMENTS

| | | |
|---|---|---|
| 2009816 | 3/1972 | (DE) . |
| 0 422 774 | 4/1991 | (EP) . |
| 0 514 156 | 11/1992 | (EP) . |
| 2 290 526 | 1/1986 | (GB) . |
| 2 203 278 | 10/1988 | (GB) . |
| 2 209 863 | 5/1989 | (GB) . |
| WO 96/05057 | 2/1996 | (WO) . |

* cited by examiner

Primary Examiner—Sam Chuan Yao
(74) Attorney, Agent, or Firm—Allen D. Brufsky

(57) ABSTRACT

A labeler for the placement of a label, having a central aperture and a peripheral edge, onto a surface of a disk, having central hole and an outer edge, comprising a disk positioning member having points of contact with the spindle hole and/or the outer edge of the disk, for positioning the disk; a label positioning member having points of contact with the central aperture and/or peripheral edge of the label, for positioning the label; and a joining member interconnected with said disk positioning member and said label positioning member, having a first position in which the label and the disk are spaced and a second position in which the disk and the label are contacted. The label positioning member is preferably a tapered cylinder which is adapted to be inserted in the central aperture. The disk positioning member is preferably a cylindrical rod. The tapered cylinder and cylindrical rod may be an integral structure.

2 Claims, 5 Drawing Sheets

DISK LABELING DEVICES

The present application is a continuation-in-part of U.S. patent application Ser. No. 08/410,239, filed Mar. 24, 1995, now U.S. Pat. No. 5,543,001, incorporated herein by reference, which is a continuation of U.S. patent application Ser. No. 08/287,153, filed Aug. 8, 1994, abandoned, incorporated herein by reference. The present application is also a continuation-in-part of WO 96/05057, filed Aug. 8, 1995 as PCT/US95/10150, incorporated herein by reference.

The present application relates to certain improvements over the Disk Labeling Devices illustrated in U.S. Pat. No. 5,543,001, issued Aug. 6, 1996, and U.S. Pat. No. 5,902,446, issued May 11, 1999.

FIELD OF THE INVENTION

The present invention relates to the field of compact disk labeling devices, and more particularly to a device for centering a disk with respect to a self-adhesive label while maintaining them in spaced relation and subsequently allowing them to contact, forming a labeled disk.

BACKGROUND OF THE INVENTION

The proliferation of compact disks (discs), also known as laser disks, in the form of music as well as CD-ROM products has become extensive. In recent years, recordable compact disks such as those produced by SONY, 3M, and KODAK have grown in popularity. Further, these disks are being used for archival data storage, immediate distribution of data, and for demonstration purposes. With this recent use has grown a need to label these disks once they have been produced. This is because once produced, there is no generally available visual method for determining the contents of a disk, without reducing storage capacity below the 680 MB of data or more, without external markings.

While manufacturers of large numbers of identical disks have their labels or identifying information painted, silk-screened or printed onto the disks, e.g., a layer of adherent ink or pigment is applied to the surface of the disk, this method is generally impractical for recordable compact disk producers. For small runs or those requiring immediate availability of the disk, printing or painting based methods of labeling take too much time, incur a significant setup charge, and require special equipment. Automated disk imprinting devices may be large and cumbersome, with bulk pigmented ink supplies generally favoring long production runs.

Another known method of labeling a compact disk employs a direct printing using an ink jet system onto the surface of a disk. These systems provide a special carrier for the disk, which is printed using a conventional ink jet printing apparatus. This method suffers the shortcomings of ink jet technology, including problems with the inks used, such as smudging, running, lack of scratch resistance on the disk surface, and the like. This ink jet printing technology is also relatively slow.

Ink markers may also be used to label disks, but this is unattractive and can cause damage to the disk by breaking down the coating which protects the disk. Permanent ink markers often include solvents in the ink. As a result, manufacturers such as Avery Dennison, Avery Division, Diamond Bar Calif., produce self-adhesive labels shaped like, and designed for compact disks. Improper placement of a label on a disk, especially with the advent of high speed, e.g., ten or higher speed data transfer (with single speed data transfer defined as the rate necessary to support CD audio), and higher information density disk recording technologies, such as Digital Video Disk ("DVD"), may result in read errors, or drive motor damage due to dynamic imbalance of the disk.

Prior to the activities of the present inventors, there was no available method or apparatus for assistance in the accurate placement of adhesive labels on compact disks.

Kodaka et al., U.S. Pat. No. 5,346,654 relates to a method for forming indicia on compact disks. This method employs a molded impression from a "mother", and does not apply an adhesive label. Lexel, U.S. Pat. No. 5,316,464 relates to a hinged structure for pressing a marking onto a compact disk, and also does not apply an adhesive label. Sugaya et al, U.S. Pat. No. 4,903,255, on the other hand, relates to an adhesive label marking system for compact disks. However, the labels are ultimately applied manually, without any apparatus for assisting in accurate placement on the disk. Hanna, U.S. Pat. No. 4,385,460 relates to an optical disk or phonorecord label having a hinged portion for individualized marking, which is apparently manually applied. Nakamura, U.S. Pat. No. 5,084,127 relates to a labeling system for 3.5 inch magnetic media encased in a rectangular plastic enclosure, and thus, while placing the labels in a desired location, do not place the label concentrically directly on the rotating media.

SUMMARY OF THE INVENTION

The compact disk labeling device and method according to the present invention therefore provides various embodiments intended to assist in the accurate placement of an adhesive label, generally bearing a pressure sensitive adhesive, to a surface of a disk. Generally, this is a so-called R-CD-ROM, or recordable compact disk read only memory, but may also be a WORM (write once, read many) disk, DVD, or other types of media having a central aperture, e.g., a spindle hole. For both functional and aesthetic reasons, it is desirable to place the label concentric with the spindle hole of the disk. Each of the label and disk have two at least two reference portions; the inner and outer edge of the label and the spindle hole and diameter of the disk. In general, it is preferable to define a location of the label by an edge of its central aperture, so that variations may be accommodated in label edge design. However, the disk has standard properties allowing it to be located by the spindle hole and/or periphery. It is preferred that the label be centered on the disk to prevent dynamic imbalance during use, especially in high speed CD drives.

Thus, since the label and disk are generally radially symmetric, the location of each may be defined by at least two points. For example, a dowel of appropriate size inserted in the spindle hole will have an area of contact, the area encompassing at least two points. Likewise, a dowel smaller than the spindle hole will have one point of contact, with a member pressing the disk against the dowel having an additional point of contact. The disk may also be located by its outer edge. Thus, since the disk has a relatively fixed shape, two points of contact are sufficient to define a location with respect to a central axis. Of course, a larger number of points of contact may be used to locate the disk.

The label is doughnut shaped, with a circular periphery and a centrally located aperture. Thus, its location is also defined by two points being on either the inner or outer edge, or both. In most cases, it is not necessary to rotationally align the label with the disk. However, where desired or necessary, this may be accomplished by defining a particular point on the label and disk for alignment. Otherwise, there is no need to rotationally align the disk and label, and an alignment of the centers of each is sufficient.

Since it is generally preferred to locate the label by the central aperture, it is also preferable to locate the compact disk by the spindle hole, leading to a compact mechanical design. However, since the mechanical design of the disk is generally symmetric and uniform, the disk may be located at an edge portion.

In order to coaxially align the label and the compact disk, the relative offsets of the spindle hole and the central aperture must be provided with fixed relation. In a preferred embodiment, the central aperture of the label is round, and larger than the spindle hole. Thus, a relation is established by providing a member having at least two points of contact with the label, the points of contact having a predetermined relation to the central aperture and/or the peripheral edge; providing a member having at least two points of contact with the compact disk, the points of contact having a predetermined relation to the spindle hole and/or the outer edge, axially aligning the two members so that the disk and label are coaxially aligned, and applying a force between the disk and label to allow adhesion.

The present invention thus provides an apparatus and method for the accurate placement of labels onto compact disks or other objects. This apparatus employs a localization device for the label, having a peripheral edge and a central aperture, and a localization device for the object, having a central hole and an outer edge, wherein the localization devices have a defined relation between one another during the process, so that after the label and object are localized, they may be brought into intimate contact and adhered together in a desired manner having a predetermined relationship. It is noted that the central aperture of the label is generally of a larger diameter than the central hole of the object, generally a compact disk. An inner margin of the disk is preferably not covered by any label in order to assure proper linkage with the compact disk drive. The peripheral edge of the label is generally of smaller diameter than the outer edge of the object, to avoid overhang.

One problem with self-adhesive labels is that they are unforgiving. Once placed in intimate contact with a disk or other object, they will adhere and can be extremely difficult to remove. Thus, the localization device must not make substantial surface contact with the label. Further, the disk and the label must be maintained separated during the labeling process until the proper alignment is achieved, and only then are the disk and label placed in intimate contact.

The self-adhesive label will not adhere firmly to a release agent treated surface, such as the backing of the label. Therefore, it may be advantageous to treat the labeling apparatus with such a release compound, e.g., a silicone compound, in order to prevent inadvertent adhesion.

The labeling process and apparatus may also be automated, according to the present invention. Thus, labels may be applied in an automated production facility. In an automated facility, it is preferred that a vacuum be applied to the label to hold it flat against a plate during application. In an automated process, the label need not be pretreated with a contact adhesive, and therefore an adhesive may be applied to or activated on the disk or the label during the process. For example, an ultraviolet activated adhesive may be applied to the label, and activated after the disk contacts the label by ultraviolet irradiation.

In a one embodiment illustrating the concept disclosed in U.S. Pat. Nos. 5,543,001 and 5,902,446, the label is centered with respect to the disk by means of a tapered member, inserted through the central aperture of the label, which gradually centers the label until it is in defined position. The disk is centered by a dowel inserted through the spindle hole. After the label and disk are centered, a force is applied, allowing adhesion of the label to the disk. The force may be applied, for example, by a base on which the label rests, adhesive surface upward. The base, in this case, has an aperture allowing the tapered member to pass through. The dowel extends upwardly from the tapered member, and thus may serve as a handle. The label is placed on the surface of the base, adhesive side upward, with the central aperture overlapping the aperture in the base. The disk is placed on the dowel, and rests against a shoulder at an upper portion of the tapered member, with the side to be labeled facing downward. The tip of the tapered member is pressed through the central aperture of the label and the aperture of the base, with the tapered portion exerting a lateral force to center the label with respect to the tapered member. After the label is centered, the disk, resting on the shoulder is further lowered, until it contacts the label. A force is applied which permits adhesion. The label normally has a contact adhesive, which requires a relatively low contact force to cause a strong adhesion.

The label thus generally has a central circular hole, larger than the central aperture in the disk, so that no clearance problems will arise. A member within this central circular hole which has a largest dimension approximately equal to the diameter of the hole, will locate the center of the label. This member is preferably a tapered tip cylinder, which provides an initial taper so that the tip may be easily guided into the central hole. Further insertion will gently relocate the label with respect to the member, until the label is concentric around the cylindrical portion of the member.

According to this embodiment, the label is placed on the surface, and the surface has an aperture of the same size as that of the label, so that the localization device may pass through both. Of course, the aperture of the surface of the base may be larger than the central aperture of the label, because it is not required to center the label with the base.

The disk has a central aperture, smaller than the hole in the label. Thus, the localization system for the disk also need include a member having a maximum width approximately equal to the diameter of the hole, with a small amount clearance. Because the disk is rigid and easy to handle, with no exposed adhesive, no taper is necessary in order to place the disk on the localization system, which may be, for example, a cylindrical rod or dowel. Advantageously, the localization system for the disk has a stop to limit the distal position of the disk on the disk localization system. e.g., the cylindrical rod, to prevent the disk from slipping off after being mounted. Advantageously, this stop is a shoulder of the tapered cylinder. A second stop may also be placed above the disk after mounting so that the disk is fixed with respect to the localization system, although this is not required. This second stop allows an axial force to be applied to the cylindrical rod to press the disk against the label, without pressing against the disk itself.

The configuration of the disk and label, each being localized by a different diameter coaxial cylindrical member, provides an opportunity for these localization systems to be formed as an integral unit, with the shoulder of the larger diameter cylinder serving as the stop for the disk. Thus, the disk is localized on the smaller diameter cylinder, and the tapered portion of the larger diameter cylinder is inserted through the label, adhesive side up. In the preferred embodiment, the label is supported by the surface, and the cylinder passes through an aperture in the surface, tapered portion first.

Thus, the label is centered by the conical taper and the larger diameter cylinder with respect to the disk. The larger diameter cylinder is insertable through the label and, in the preferred embodiment, the aperture in the surface. When the label is in a plane near the junction between the larger and smaller diameter cylinders, the disk lies nearly adjacent to the label, properly positioned. Pressure may then applied on top of the disk, by any suitable means, including manual pressure, pressure on a pressure plate, an automatic pressure device, a spring or weight, or other known means, forcing intimate contact between the label and the disk, thus adhering the two.

This embodiment of the labeler is used in the following manner. An orienting apparatus is provided in which a positioning plate is provided on top of a cylindrical base, having a hollow core region under the positioning plate. The positioning plate has a central aperture. Preferably, the base is placed on a substantially flat surface, although this is not necessary. A compact disk shaped adhesive label, having an inner diameter larger than the central core area of the compact disk and an outer diameter smaller than the compact disk is placed onto a surface area of the positioning plate with the adhesive side of the label facing away from the positioning plate. The label is positioned so that its center hole area is approximately over a positioning hole in the positioning plate, with at least a small overlapping portion. The compact disk is placed onto a cylindrical extension of a positioning cone with the readable side of the compact disk facing away from the cone, by placing the cylindrical extension through a center hole in the compact disk so that a center area of the compact disk is resting upon a flat surface of the cone. The compact disk is then lowered onto the label by inserting the positioning cone through overlapping portion of the center hole area of the self-adhesive label and the positioning hole in the positioning plate, and into the hollow core portion of the cylindrical base, below the positioning plate. A force is then applied between the compact disk and the label to affix the label to the disk.

The compact disk with the newly affixed label is then removed from the device by lifting the cylindrical extension and pulling the positioning cone out of the positioning hole and the hollow core portion. Thereafter, the compact disk is lifted off the cylindrical extension. If not permanently affixed, the positioning plate may be removed from the cylindrical base and used to further press the label onto the compact disk. This last step is carried out by placing the positioning plate on top of the compact disk and manually pressing the plate against the disk while the disk is lying on a substantially flat surface. A separate pressure plate may also be provided, or another compact disk employed in order to compress the label.

The preferred materials for construction of the apparatus include Plexiglass®, acrylic plastic, other plastics, including thermoformable resins, wood, metals, including aluminum and brass, minerals, glass, ceramics, composites and rubber. These may be transparent, providing a decorative appearance in addition to the functional attributes. In general, the material selection is not critical to the functionality, so long as the device supports the weight of itself, the label and disk, as well as withstands the force applied to adhere the disk to the label. In addition, it is preferred that the device, especially the edges, be made of or coated with a soft material which reduces the risk or scratching or marring the surface of the disk. The device may be fabricated by molding, machining, welding (e.g., metal welding or ultrasonic welding), gluing or by other means as known in the art.

Preferably, the label is held and pressed flatly against the disk, to avoid wrinkles. Alternatively, after suitable alignment, the label may be "rolled" onto the disk, i.e., applied to the disk by applying pressure along a chord or radius of the disk extending across the label.

Further, in order to prevent finger prints from appearing on the data surface of the compact disk, it is preferred that the pressure be manually applied centrally to the compact disk, inside the data region, or that a separate device, e.g., a plate or "dummy" compact disk, be provided to apply pressure to the disk without finger contact. Of course, a user may wear gloves to avoid direct finger contact.

Generally, contact adhesives applied to labels have a strong adhesion even when applied under light pressure; the reason for care in the application of pressure is to assure that the label does not shift or curl during application and to eliminate air bubbles under the label.

According to one embodiment of the invention, the member for axially aligning the disk and the member for axially aligning the label are affixed to one another. Since the disk spindle aperture is smaller than the label central aperture, a coaxial structure having varying characteristic radii is provided, having a first member for aligning the label, a member having a stop axially spaced from the label for aligning the disk, and means for selectively contacting the label and the disk after alignment. For example, the contacting means may be a spring loaded cylinder with a central spindle mounted in a plate, so that the label is supported by the plate and centered by the cylinder; the disk is supported by the cylinder and centered by the spindle, and after centering of each, the disk may be lowered to contact the label by compressing the spring. Alternately, instead of a spring load, with automatic reset, a manually resettable structure may be provided, having a lock to maintain spacing during alignment and a release mechanism to allow label application. A suitable spring may be a helically wound resilient element, a torsion spring, a flexion spring, a pneumatic "spring" return mechanism, or other known return systems capable of applying a force of between about 50–1000 dynes over a distance of between about 0.2–3 cm.

As a variation, an electrical system may be provided to retract the cylinder and disk spindle into a base having the plate, e.g., with a solenoid or motor. In this case, the disk spindle may have a retractable lock to hold the disk during retraction, and release after the label is applied.

In another embodiment, the flexibility and central aperture of the label are advantageously used to apply a sweeping pressure, which may be radial or secant, applying portions of the label sequentially to the disk. In this case, the label and disk are aligned, with the disk held in position and the label held spaced from the disk. The label may be held separated from the disk by, for example, compressing an outer margin between two plates, with a plate contacting an adhesive coated surface having a release coating. A first portion of the label is contacted with the disk, and thereafter adjacent portions are also adhered, until the entire label is adhered. In this way, a relatively high contact force may be applied over the small area of initial contact of the label and disk to assure intimate contact and to eliminate bubbles. The sweeping motion may be manually or automatically generated.

Any member which temporarily contacts the adhesive portion of the label is preferably a non-stick surface, such as Teflon or a material coated with a silicone release compound.

In a further embodiment, the label and compact disk are each aligned with respective portions of a mechanically interconnected structure. The interconnection may be, for example, a hinge. The label, in this case, retains its releasable backing until immediately before application. A small portion of the label backing is removed and the edge of the adhesive label contacts a portion near the edge of the disk. Thereafter, the backing is rolled away from the label, and the exposed portion of the label is then adhered to the CD surface. In this case, the separation of the releasable backing and self-adhesive label generates a static electrical charge, which may be advantageously used to bring the CD surface and label into intimate contact. The hinged member on which the label is located may be formed of a curved springy material, such as a thin sheet of spring steel. The label and compact disk are each placed over a respective centering guide. A portion of the label backing proximate to the hinge is removed, with a free edge of the label caught under a small plate, and the hinge closed so that the exposed portion of the label contacts the disk. Thereafter, the label backing is continuously removed while the hinge is closed. The springy material causes a pressure to be applied near the advancing margin of the adhered label and disk, until the adhesion is complete. The hinge is opened, and the labeled compact disk may be removed.

When separated from the backing, the labels tend to curl, especially if the backing is held flat and the label pulled back at an angle, flexing the label. Therefore, it is preferred that the label be held flat during backing removal and the backing flexed. Another concern is the potential generation of a static electrical charge caused by separation of the label and the backing. This static may be dissipated by providing an ion generator static eliminator, a humidifier or other known means. Alternatively, this static charge may be advantageously employed to assist in holding the label in a desired position. Therefore, the apparatus may include a high voltage, low power generator which creates a charge opposite the induced charge on the label, so that the charge causes the label to lay flat. Such a charge may be generated by a miniature Van de Graff generator, inductive high voltage power supply, capacitive voltage multiplier, or by creating a triboelectric charge (frictionally-induced static electricity) on the surface of the apparatus before the label is placed on the surface.

A further method for maintaining the label flat during application is the use of an air pressure differential. In such an embodiment, a low pressure chamber may be present below the surface where the label is placed. Small holes in the surface continuous with the chamber will hold the label flat against the surface during application. A pressure may also be applied from above the porous surface, such as by means of a piston in cylinder, which may include the disk to be labeled as a part of a piston structure. Further, the Bernoulli effect may be employed by flowing a stream of air parallel to the label surface, to hold the label adjacent the supporting surface. In the event that a vacuum or pressure is maintained, a battery operated pump or fan may be used, with the batteries and electromechanical elements contained in the base of the labeler. An optical or mechanical sensor may be employed in order to detect the presence of a label and activate the system, thus conserving energy.

A further method of holding the label adjacent to the surface is to provide a slightly tacky substance on the surface which will gently adhere the label. In this case, the label including backing may be placed on the surface, and the backing removed while the label is held in place.

Where electrical mechanisms are employed, e.g., motors, pumps, power supplies, it is preferred that the system be powered by batteries, e.g., AA, C or D alkaline cells. Rechargeable and other primary batteries, such as nickel cadmium, nickel metal hydride, lithium ion, zinc air and other known chemistries may also be used. Of course, AC line power may be used, however this reduces portability.

The apparatus thus preferably includes a surface for applying a force between the label and the object to be labeled. In the case of a flat disk, the surface will also be flat; however, if an object having a more complex surface is to be labeled, the surface of the apparatus should conform to the surface of the object, allowing for the thickness of the label. Of course, the label-applying force may be applied without the use of a flat surface in other embodiments.

OBJECTS OF THE INVENTION

It is therefore an object of the invention to provide a system and method for applying a label to a compact disk.

It is a further object of embodiments of the invention to provide automation to the process of labeling compact disks with adhesive labels.

It is a still further object of embodiments of the invention to provide a functional linkage between the members for aligning the compact disk and label, as well as a member for applying a force to contact the label with the disk surface.

It is another object of embodiments of the invention to reduce the need to manually handle the compact disk while providing a compact and efficient labeling device.

It is still another object of embodiments of the invention to employ a force other than gravity to either hold the compact disk and label apart or to contact them together.

It is therefore an object according to embodiments of the present invention to provide a labeling apparatus and method for coaxially orienting an adhesive label and a flat object before contacting them, so that the label is positioned properly when an adhering pressure is applied.

It is another object of the present invention to provide a labeler for the accurate placement of pre-made and self-adhesive labels onto compact disks with limited trapped air bubbles.

It is a still further object of the present invention to provide a labeler for the near perfect placement of pre-made and self-adhesive labels onto compact disks without damaging the compact disks and maintaining dynamic balance.

These and other objects of the invention will become apparent from a review of the detailed description of the invention and drawings. However, the scope of the patent is deemed limited by the claims.

DETAILED DESCRIPTION OF THE PREFERRED EMBODIMENTS

Figure 1:
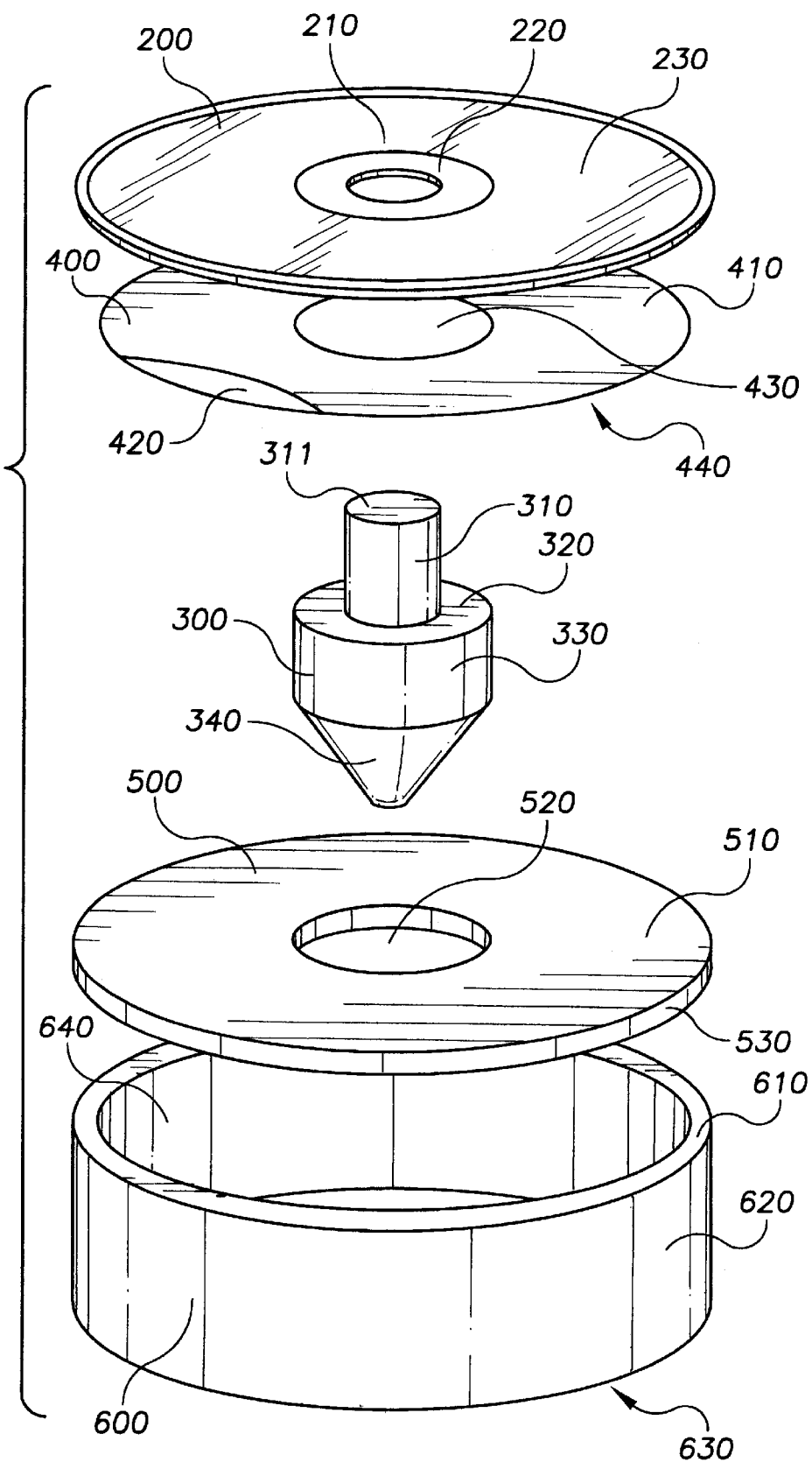
FIG. 1 is an exploded view of a first compact disk application system according to concept of the present invention previously disclosed in U.S. Pat. Nos. 5,543,001 and 5,902,446.
Figure 2:
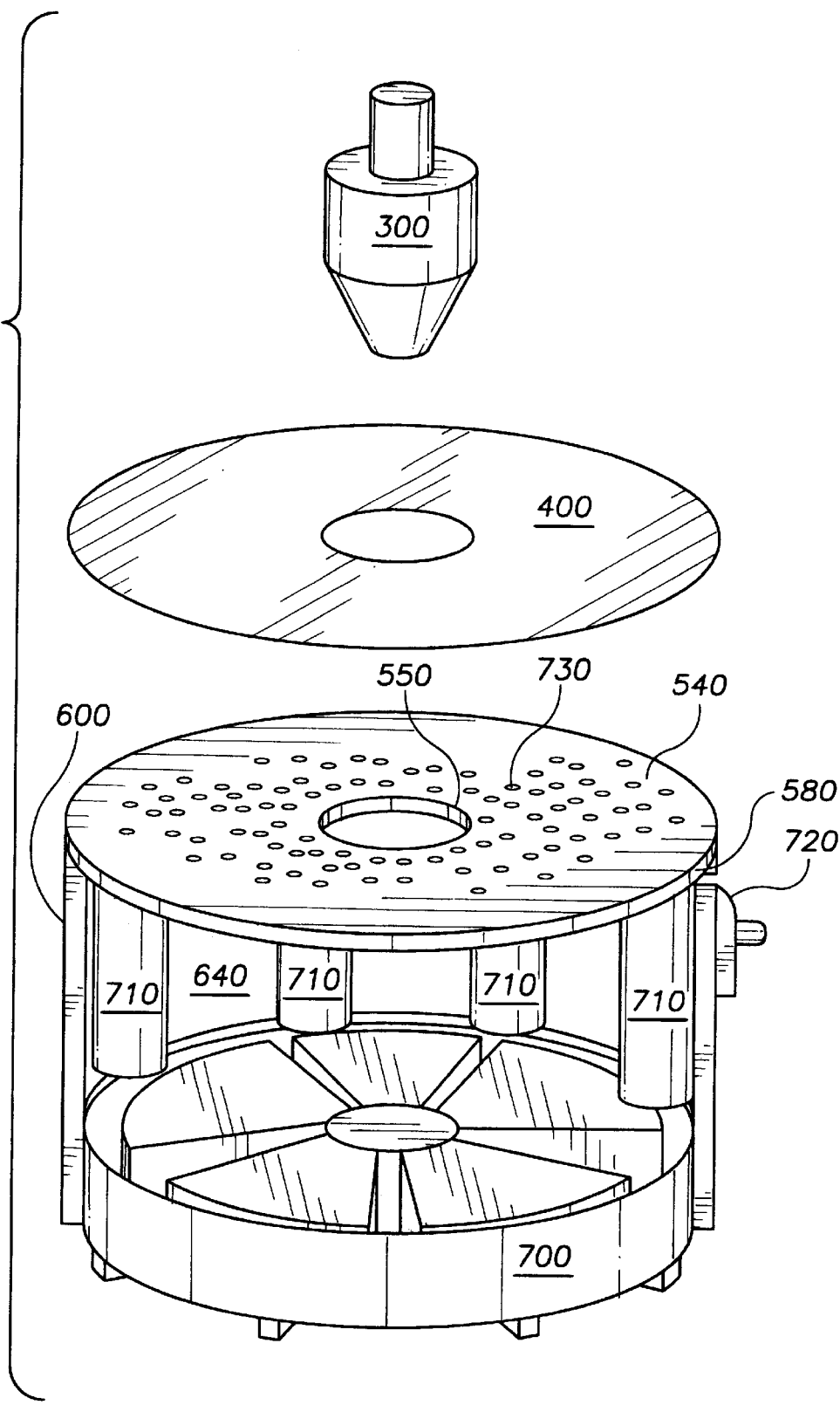
FIG. 2 is an exploded view of a second compact disk application system according to the present invention.

The invention will now be described by way of the drawings, in which like reference numerals depict like elements.

EXAMPLE 1

Referring now to FIG. 1, a compact disk labeler illustrated as disclosed in U.S. Pat. Nos. 5,543,001 and 5,902,446 provides for the placement of self adhesive labels 400 onto compact disks 200. The labeler includes a base unit 600 having a positioning plate 500, and a positioning cone 300.

Compact disk 200 has a center hole 210, a medium surface 230, having an area containing optically readable data, a center area 220 inside an area of data medium surface 230, and an outer edge 240 which does not contain optically readable data. Standard compact disks 200 have a diameter of 12 centimeters, although the present is adaptable for disks of other sizes and configurations, e.g., mini compact disks having a diameter about 5 cm and full size optical disks having a diameter of about 25 cm. A center hole 210 of the compact disk has a diameter of about 1.5 centimeters. The center area 220 of the compact disk has a diameter of about 4 centimeters, and the outer edge 240 is about 1 millimeter wide. Single sided compact disk 200 has a side which can be covered with a label and a side which cannot be covered so as to allow the information stored upon the compact disk to be accessed. The difference between the different sides of a compact disk 200 as well as the general design of compact disks 200 are well known to those skilled in the art.

The labeler includes a positioning cone 300. Positioning cone 300 is formed of clear acrylic. Protruding from positioning cone 300 is a cylindrical extension 310. Cylindrical extension 310 is adapted to fit inside the center hole 210 of compact disk 200. The cylindrical extension has a small clearance fit with the wall of the center hole 210, so as to provide easy insertion and removal of the cylindrical extension 310 from the center hole 210 of compact disk 200 and to ensure that compact disk 200 will be accurately aligned while it is around the cylindrical extension 310. Preferably, the diameter of the elongated stock 310 will be about 0.5 millimeters less than the diameter of center hole 210, although other diameters may also be suitable. Cylindrical extension 310 is also preferably long enough so as to provide easy gripping by the user. The cylindrical extension 310 is preferably about 2.5 to 5 cm long from the tip 311 to where it attaches to flat surface 320.

Flat surface 320 is provided to stop the compact disk 200 from moving any further down cylindrical extension 310 toward the positioning cone 300. Flat surface 320 is integrally linked to cylindrical extension 310 and body member 330. Body member 330 merges with tapered portion 340, which terminates as a small radius or flat surface of about 1 centimeter diameter. Tapered portion 340 is designed to facilitate the easy penetration and exit of positioning cone 300 into and through positioning hole 520 in positioning plate 500. The configuration of positioning cone 300 is therefore similar to a classic spinning top, although the tapered portion 340 need not have low friction at its terminus for free spinning. The diameter of flat surface 320 is approximately the same as the diameter of the center area 220 of compact disk 200, e.g., about 4 centimeters, and therefore greater than that of the elongated stock, e.g., about 1 centimeter. When compact disk 200 is placed upon cylindrical extension 310 by placing tapered portion 311 into center hole 210, the compact disk 200 will rest against the flat surface 320. The cylindrical extension 310 is coaxial with the positioning cone 300, so that if the compact disk 200 and positioning cone 300 were observed by looking at the point 340 with elongated stock 310 positioned away from the observer, that all of the compact disk 200 would be visible except for center hole 210 and center area 220. Thus, visual confirmation may be obtained of the correct configuration.

A self-adhesive label 400 is designed to fit onto the top of a compact disk 200 so as to allow for easy identification of the information provided upon compact disk 200. Self-adhesive label 400 has a writing surface 410 upon which text can be printed using a laser printer, ink jet printer, pen, typewriter or other writing means. The self-adhesive label is preferably printed prior to labeling of the compact disk 200. Self-adhesive labels are produced to fit onto compact disk 200, covering all or most of the non-readable side of the compact disk 200 except for the center hole 210, the center area 220, and the outer edge 240. On the opposite side of self-adhesive label 400 from writing surface 410 is adhesive side 420. Adhesive side 420 is typically covered with a an adhesive which releases easily from a backing and allows the self-adhesive label 400 to be permanently attached to most other untreated surfaces. Self-adhesive label 400 typically has a hole area 430 where there is no label material, and which leaves self-adhesive label 400 having a flat doughnut configuration. Normally, the label is provided as a circular label on a backing sheet, with an inscribed center hole which may easily be detached from the outer label portion. Hole area 430 will typically correspond to and have a similar, if not exact, diameter to that of center area 220 of compact disk 200. Such self-adhesive labels 400 are typically manufactured from paper, Tyvek, vinyl or any other material suitable for labeling. Such self-adhesive labels 400 are well known to those skilled in the art.

A positioning plate 500 is illustrated. Positioning plate 500 has a positioning hole 520, a top area 510, and a side area 530. Positioning hole 520 is located substantially in the center of the plate 500 and is designed to allow positioning cone 300 to slide through it. Ideally, positioning hole 520 will have a diameter about 0.5 millimeters larger than positioning hole 300. Additionally, the diameter of the positioning hole is substantially the same as the diameter of the center area of the compact disk. Thus, the center hole of the label 430, the positioning hole 520 of the positioning plate 500 and the center area of the compact disk all have a diameter of about 4 centimeters, with slight variation. The diameter of positioning hole 520 is designed so as to allow positioning cone 300 to easily penetrate and exit position hole 520, while avoiding side to side movement.

Surface area 510 is designed so that a compact disk 200 can rest upon it without extending over its edges. Preferably, surface area 510 will have a diameter about 1 centimeter larger than the diameter of compact disk 200. The larger diameter is provided to facilitate a flat surface so that self-adhesive labels 400 can be placed upon compact disks 200 with minimum bubbling, and to allow initial imprecise placement of the label which is then corrected by the positioning cone.

The side area 530 is the thickness of the positioning plate 500, and provides thickness and strength. As such, side area 530 is preferably wide enough to limit the flexibility of the positioning plate 500. Positioning plate 500 is preferably formed of clear acrylic sheet, attached to the cylindrical base 600. Positioning plate 500 may be covered with a soft material such as, but not limited to, flannel so as to avoid scratching the compact disk 200. The covering may also be an antistatic material.

Cylindrical base 600 has a flat lip member 610, a flat bottom 630, a wall 620 and a hollow space 640. Flat lip member 610 supports the positioning plate 500 to rest flatly on top of it, and may be glued or fused together. Therefore, flat lip member 610 preferably has an inner diameter which is smaller than that of positioning plate 500 so that positioning plate 500 is stably supported by cylindrical base 600.

The positioning plate may also be within the cylindrical base member and supported at the inner surface of the cylindrical base 600.

Wall 620 spaces flat lip member 610 from a lower portion of the base 600, preferably at a height which will allow positioning cone 300 to pass through positioning hole 520 of the positioning plate 500 so that if positioning cone 300 were to enter with point 340 first, all of the positioning cone 300 except for elongated stock 310, could fit below the level of flat lip member 610.

Flat bottom 630 is preferably flat so that cylindrical base 600 will sit stably on a table top or other surface.

Hollow space 640 must merely be large enough to allow positioning cone 300 to fit within the hollow space 640, if the positioning cone 300 were to enter with tapered terminus 340 first, and all of the positioning cone 300, except for elongated stock 310, were to fit below the level of flat lip member 610.

The preferred cylindrical base 600 is formed of an acrylic cylinder, although other materials and configurations are possible.

EXAMPLE 2

In use, the positioning plate 500 is provided on top of cylindrical base 600, with the positioning plate 500 in contact with flat lip member 610, preferably affixed thereto. The flat bottom 630 is supported by an external surface, such as a table top or other desired flat surface. Then, the self-adhesive label 400 is placed onto surface area 510 of positioning plate 500, with adhesive side 420 facing up and away from positioning plate 500. Self-adhesive label 400 is placed on positioning plate 500 in a manner which positions self-adhesive label 400 so that hole area 430 is overlapping the positioning hole 520. As such, an observer should be able to see through self-adhesive label 400 and positioning plate 500 and into cylindrical base 600. Then compact disk 200 is placed onto positioning cone 300 by placing elongated stock 310 through center hole 210, so that center area 220 of compact disk 200 is resting upon flat surface 320. The compact disk 200 on the cylindrical extension 310 is then lowered onto the self-adhesive label 400 by inserting positioning cone 300, with the tapered portion 340 entering first, through hole area 430 and positioning hole 520, and into hollow space 640 of base 600. As compact disk 200 comes to rest upon self-adhesive label 400, which is supported by positioning plate 500, compact disk 200 will separate from flat surface 320, while still remaining on cylindrical extension 310. In this manner, self-adhesive label 400 is secured onto compact disk 200 so that the label will cover substantially all of the non-readable side of the compact disk 200 except for the center hole 210, the center area 220 and the outer edge 240. Pressing with, e.g., the user's fingers, further facilitates proper adhesion, and eliminates any trapped air bubbles under the label.

The compact disk 200 is lifted with its newly affixed self-adhesive label 400 by lifting cylindrical extension 310 and pulling positioning cone 300 out of both positioning hole 520 and hollow space 640. Compact disk 200 is then removed from cylindrical extension 300 by lifting compact disk 200 off of cylindrical extension 310. When the positioning plate is removable from the cylindrical base, the positioning plate 500 may then be removed from base 600, and while laying compact disk 200 on a flat surface, which may be covered with a soft material such as a cotton towel, and the self-adhesive label 400 is pressed further onto compact disk 200, by placing positioning plate 500 on top of compact disk 200 and then pressing.

The method produces a compact disk with a label affixed near-perfectly and with limited trapped air bubbles.

EXAMPLE 3

Figure 3:
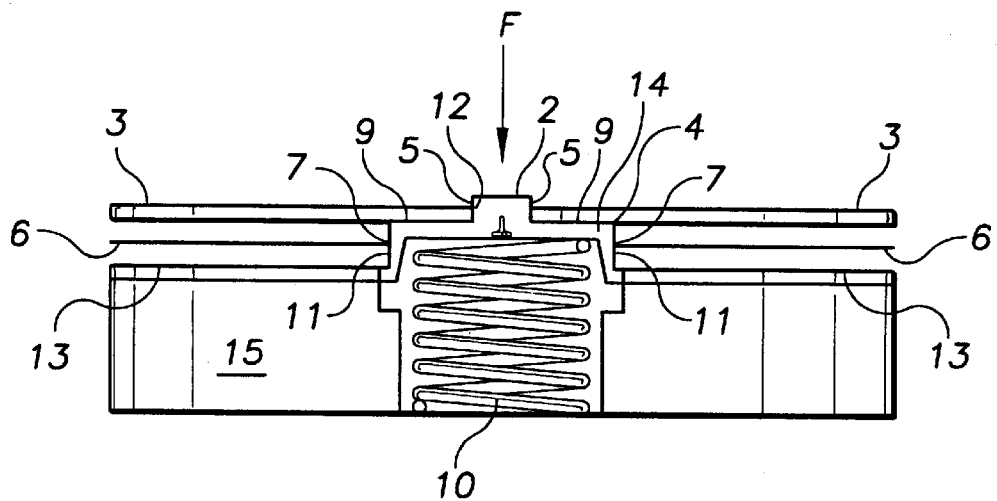
FIG. 3 is a perspective view of a spring-loaded embodiment according to the present invention.

Referring now to FIG. 3, a labeler is provided generally in accordance with the embodiments of Examples 1 and 2. The positioning plate 500 has a plurality of evenly spaced small holes 540, e.g., 0.5 mm diameter holes in a hexagonal array on 1.0 centimeter centers. A 6 volt muffin type fan 700 is provided in the base 600, which exhausts out of the base 600 to draw a partial vacuum in the hollow space 640. Thus, a flow is directed inward through the holes 540, which will draw the label 400 toward the positioning plate 500. The inner edge of the positioning hole is provided with an "O" ring 550 to seal around the positioning cone 300, which has a smooth surface.

The muffin fan 700 is driven by 4 D-type alkaline cells 710, which are arranged inside the base 600. An on-off switch 720 is provided on a side of the base. Alternately, a switch 730, e.g., a Microswitch-type mechanical sensor, may be provided in cooperation with the O-ring 550, which activates the muffin fan 700 when the positioning cone is inserted.

EXAMPLE 4

As shown in FIG. 3, an embodiment is provided with the alignment members and base connected. A member for axially aligning the disk 3 and the member for axially aligning the label 6 are affixed to one another. Since the disk 3 spindle aperture 5 is smaller than the label 6 central aperture 7, a coaxial structure 8 having varying characteristic heights is provided, having a first member 11 for axially aligning the label 6, a second member 12 axially aligning the disk 3 having a stop 9. The second member 12 extends upwardly from member 11 for axially aligning the disk 3, and means for selectively contacting the label and the disk after alignment. For example, the contacting means may be a spring 10 loaded cylinder 14 with a central spindle 2 mounted in a plate 13, so that the label 6 is supported by the plate 13 and centered by the cylinder 14; the disk 3 is supported by an upper portion of the cylinder 14 and centered by the spindle 2, and after centering of each, the disk 3 may be lowered to contact the label 6 by compressing the spring 10 and retraction of the cylinder 14 into the base 15.

Alternately, instead of a spring load, with automatic reset, a manually resettable structure may be provided, having a lock or latch to maintain spacing during alignment and a release mechanism to allow label application. The release may be manual or automatic, e.g., released when a minimum pressure is exceeded. Likewise, the spring may be a helically wound resilient element, a torsion spring, a flexion spring, a pneumatic "spring" return mechanism, or other known return systems capable of applying a force of between about 50–1000 dynes over a distance of between about 0.2–3 cm. The force range prevents inadvertent or premature contacting of the label and disk, while allowing ease of operation.

EXAMPLE 5

Figure 4:
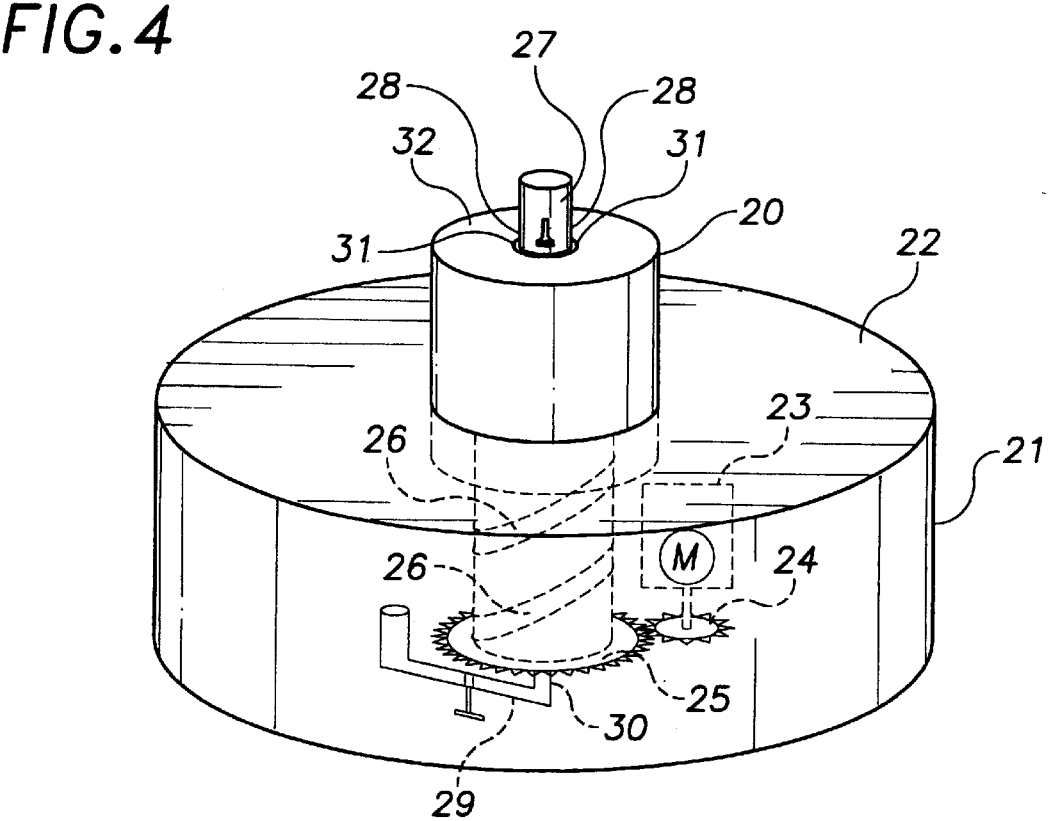
FIG. 4 is a perspective view of a motor-driven embodiment according to the present invention.

As shown in FIG. 4, the process may be automated by an electrical or electromechanical system. In this case, an electrical system is provided to retract the cylinder 20 into a base 21 having the plate 22, e.g., having a solenoid or motor 23. The motor has a gear train 24, 25, which rotates a helical cam member 26, which interoperates with a set of followers (not shown in the figure) on the cylinder 20.

In this case, the disk spindle 27 may have a retractable lock 28 to hold the disk 3 during retraction, and release after the label 6 is applied. As shown in FIG. 4, the lock 28 is actuated by a lever arm 29 which displaces a member 30 up through the cylinder 20 and disk spindle 27 to actuate and deactuate the lock 28. The lever arm 29, in turn, is actuated by a movement of the cylinder 20. The lock 28 includes one or more barbed catches 31 which allow the disk 3 to be slid over, but do not allow retraction when the lock 28 is actuated. When the cylinder 20 reaches a lower position, the lever arm 29 depressed, actuating the lock 28 and preventing relative axial movement of the disk. When the cylinder 20 is raised above an actuation level, the cylinder 20 no longer depresses the lever arm 29, and the lock 28 is deactuated, allowing removal of the disk 3.

As in the embodiment of FIG. 3, the label 6 rests on the top surface of the base 22, aligned by the cylinder 20, while the disk 3 is aligned by the disk spindle 27 and rests on the shoulder of the cylinder 32.

EXAMPLE 6

Figure 5:
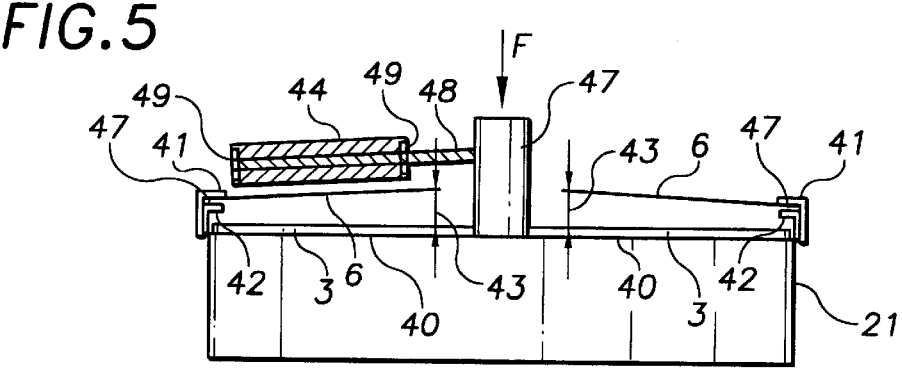
FIGS. 5, 5A and 5B is a perspective view of a radially swept embodiment according to the present invention.
Figure 5A:
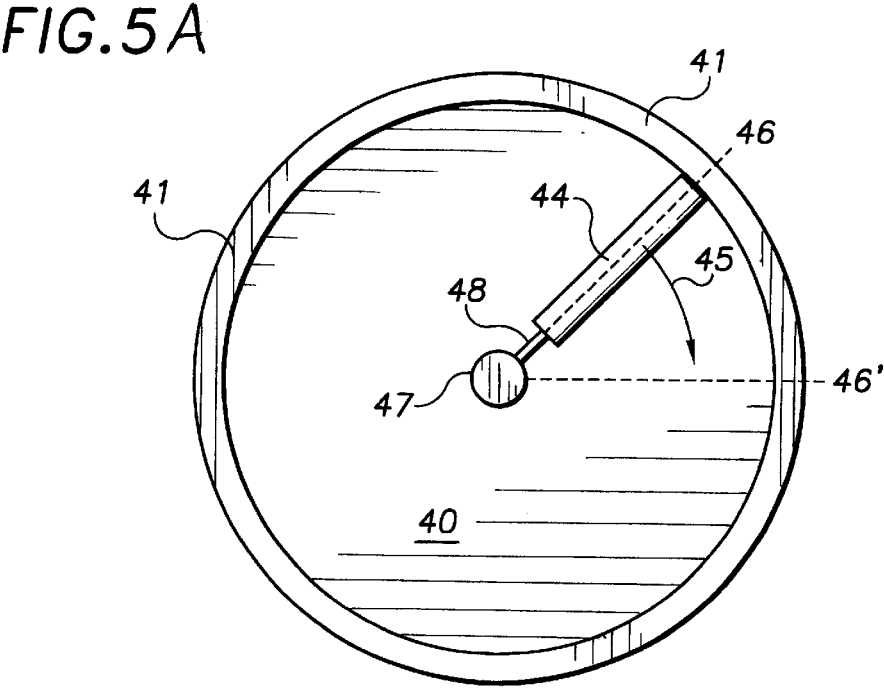
Figure 5B:
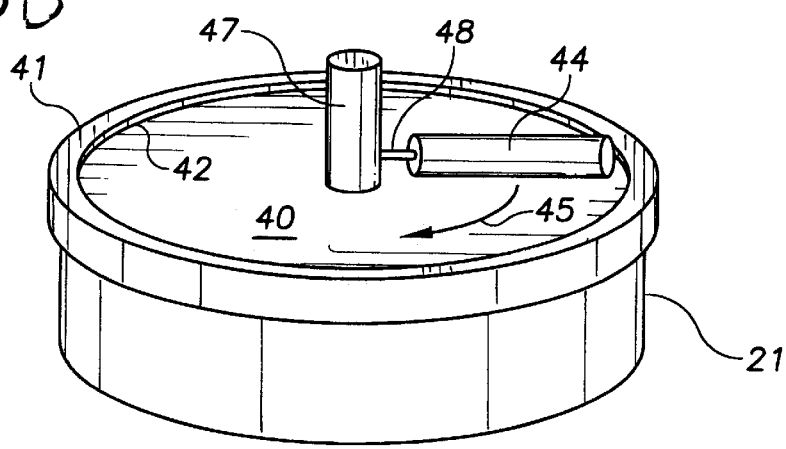

As shown in FIGS. 5–5b, the flexibility and central aperture of the label are advantageously used to apply a radial sweeping pressure, applying the label sequentially around the disk.

In this case, the label 6 and disk 3 are concentrically centered, with the disk 3 flat on a surface 40 and the label 6 sandwiched between two stiff plates 41, 42 having openings slightly smaller than the outer diameter of the label 6. The label 6 is spaced a small distance 43 from the disk 3, and a radially oriented roller 44 pressed against the label 6 toward the disk 3. The radial axis 46, 46' of contact pressure then sweeps 45 around the label 6, until the entire label 6 is adhered to the disk 3. The label 6 sandwiched between the plates 41, 42 normally holds the label 6 spaced from the disk 3. As the sweep 45 progresses, portions of the edge 47 of the label 6 are pulled from between the plates 41, 42 and contact the disk 3 surface. Accordingly, a thin label 6 with a high susceptibility to air pocket (bubble) formation may be applied to a disk 3 with a relatively high contact force F along a radial axis 46, 46'. Thus, the entire force F is concentrated over a small area to eliminate bubbles or potential bubbles. The sweeping motion 45 may be manually or automatically generated. Thus, a handle may be provided on the disk spindle 47, to allow manual rotation to generate the sweeping motion 45. Alternately, a motor 23 in the base 21 may rotate the disk spindle 47 in similar manner to the embodiment show in FIG. 4. In like manner to FIG. 4, a helical cam may also be used to apply contact force F, although this force F is maintained over a full rotational sweep 45 of the radially oriented roller 44. The radially oriented roller 44 is attached to the disk spindle 47 through an axle 48, with bearings 49 which allow the radially oriented roller 44 to rotate.

The plate 42 which contacts the adhesive portion of the label 6 preferably has a non-stick surface, such as Teflon or a material coated with a silicone release compound.

In alternate embodiments, the label is not precoated with a contact adhesive, and thus must be coated adhesive before contacting the disk surface. In this case, a liquid adhesive may be formed as droplets and sprayed onto the disk or label surface. If the adhesive is in powder form, an electrostatic spray process may be used to evenly coat the label, which is then contacted with the disk. If the adhesive is a viscous solution, a spreader may be used to form a thin film of adhesive on the disk or label. The label may also have a heat sensitive adhesive, in which case the label is heated to activate the adhesive immediately prior to, or after contacting the disk. Such non-contact adhesive coated labels may be used in conjunction with any suitable arrangement according to the present invention.

EXAMPLE 7

Figure 6:
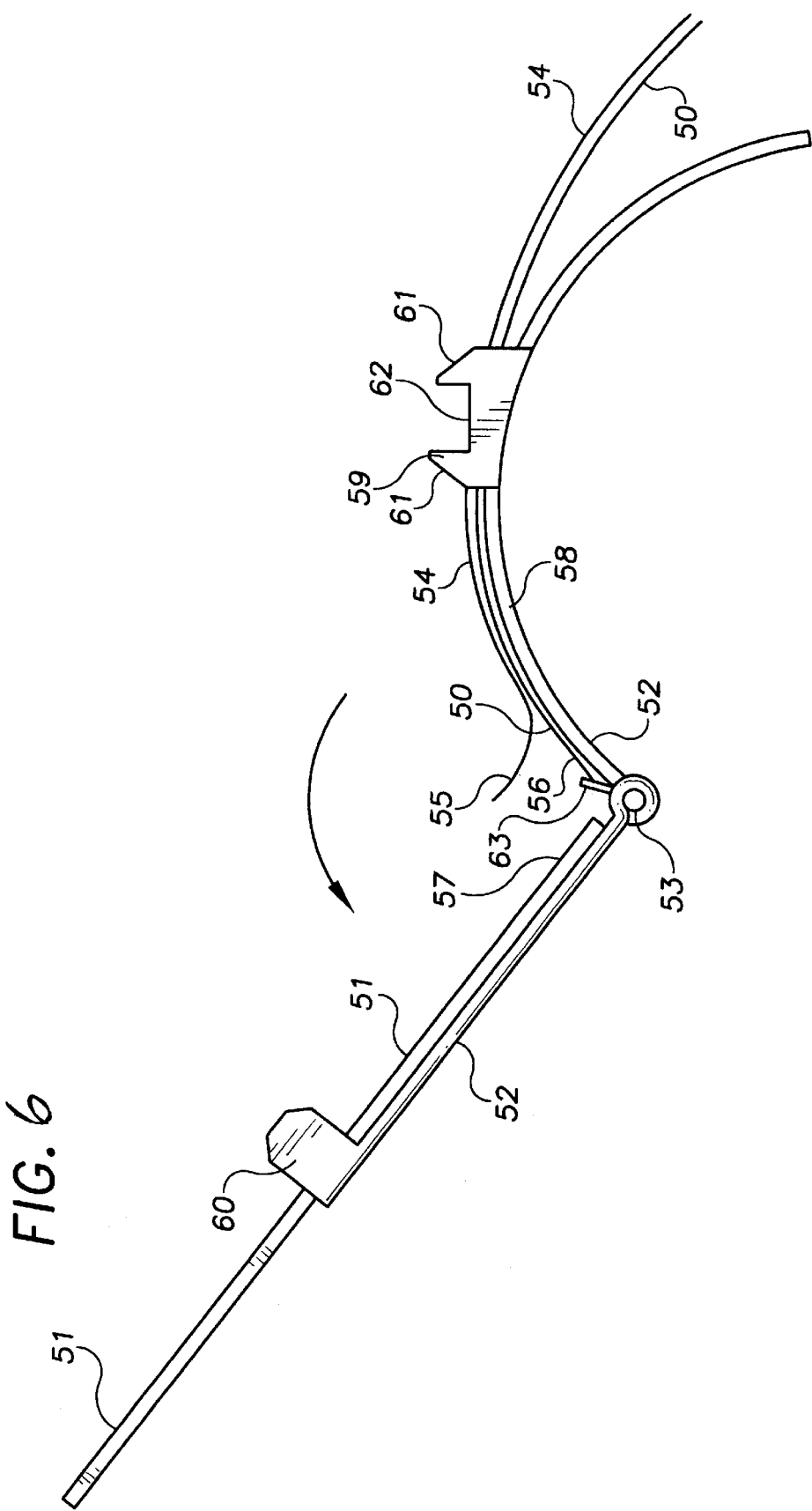
FIG. 6 is a perspective view of an edge first contact embodiment according to the present invention.

As shown in FIG. 6, the labeling device according to the present invention need not be radially symmetric. In this embodiment, the label 50 and compact disk 51 are each aligned with respective portions of a mechanically interconnected structure 52. The interconnection may be, for example, a hinge 53. The label 50, in this case, retains its releasable backing 54 until immediately before application. A small portion 55 of the label backing 54 is removed and the edge of the adhesive label 56 contacts a portion 57 near the edge of the disk 51. Thereafter, the backing 54 is rolled away from the label 50, and the exposed portion of the label 50 is then adhered to the disk 51 surface. In this case, the separation of the releasable backing 54 and self-adhesive label 50 generates a static electrical charge, which may be advantageously used to bring the disk 51 surface and label 50 into intimate contact. The hinged member 58 on which the label 50 is located may be formed of a curved springy material, such as a thin sheet of steel. The label 50 and compact disk 51 are each placed over a respective centering guide, the label centering guide 59 and the disk centering guide 60. The label centering guide 59 has a tapered edge 61 and a recess 62 to envelop the disk centering guide 60. A portion of the label backing 55 proximate to the hinge 53 is removed, with a free edge 56 of the label caught under a small plate 63, and the hinge 53 closed so that the exposed portion of the label 56 contacts the proximate portion of the disk 57. Thereafter, the label backing 54 is continuously removed while the hinge 53 is closed. The springy material 58 causes a pressure to be applied near the advancing margin of the adhered label 50 and disk 51, until the adhesion is complete. The hinge 53 is opened, and the labeled compact disk may be removed.

It should be understood that the preferred embodiments and examples described herein are for illustrative purposes only and are not to be construed as limiting the scope of the present invention, which is properly delineated only in the appended claims.

What is claimed is:

1. A device for applying a label having a central aperture of a first diameter to a disk having a central aperture of a second diameter, wherein the first diameter is greater than the second diameter, the device comprising:

a plate provided with an upper surface capable of supporting the label;

a coaxial structure received through a hole in said plate for aligning said disk and label, said coaxial structure including a stop intermediate its height for supporting a disk in spaced relation to a label on said plate, and a cylindrical portion having an outer surface of a diameter slightly less than the central aperture first diameter of the label extending downwardly from said stop to center a label relative to a disk seated on said stop, and a central spindle of a diameter slightly less than the central aperture second diameter of the disk extending upwardly from said stop to center a disk relative to a label supported on said plate, and a base having an upper end, a lower end, and a spring that cooperates with said cylindrical portion of said coaxial structure, said plate extending laterally on the upper end of said base, and said cylindrical portion is slidably received in said base through the hole in said plate and is adapted to move from a first position against the bias of said spring to a second position sufficient to enable contact between a disk seated on said stop and a label on said plate.

2. A device according to claim 1, wherein said spring is retained within said base by closure means extending across the lower end of said base.

* * * * *